Oct. 1, 1968 R. GROSS 3,403,958
SPECTACLE HINGE CONSTRUCTION HAVING AN EXPANDABLE ANCHOR
Filed April 26, 1965
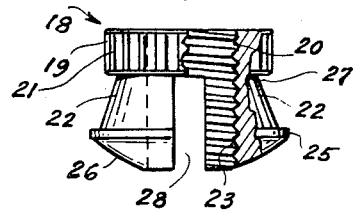
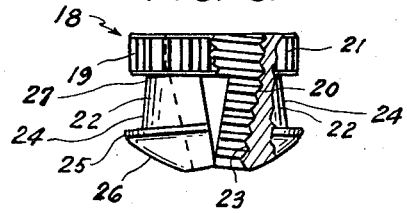
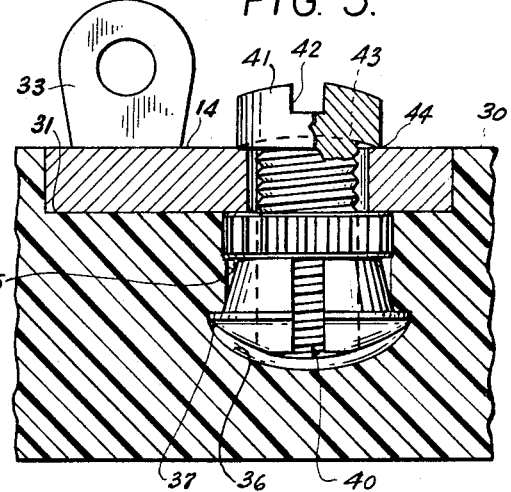
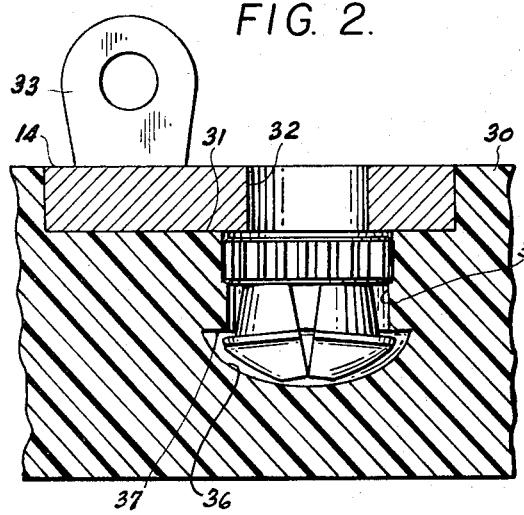
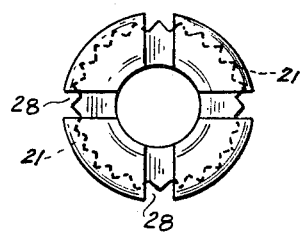
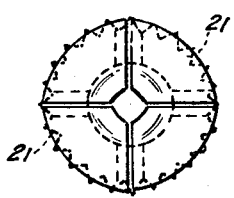
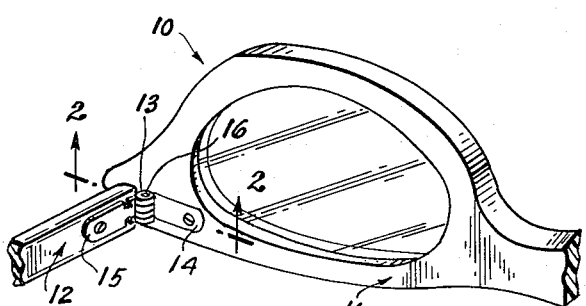
INVENTOR
ROBERT GROSS
BY *Percy Freeman*
ATTORNEY.

United States Patent Office 3,403,958
Patented Oct. 1, 1968

3,403,958
SPECTACLE HINGE CONSTRUCTION HAVING
AN EXPANDABLE ANCHOR
Robert Gross, Hackensack, N.J., assignor to Hudson Optical Corporation, Long Island City, N.Y., a corporation of New York
Filed Apr. 26, 1965, Ser. No. 450,905
1 Claim. (Cl. 351—153)

ABSTRACT OF THE DISCLOSURE

A spectacle construction having securement means for securing a hinge plate to a spectacle frame, said securement means comprising an externally serrated, annular member having a plurality of legs extending therefrom and shoulders on each of said legs for abutting engagement with an undercut in the frame piece upon spreading of the legs.

This invention relates generally to spectacle constructions, and is especially concerned with a unique hinge connection for use in attaching the temple pieces to a spectacle front or frame.

While the device of the present invention has been primarily developed and employed for use in spectacle hinges, it is appreciated that the advantageous features of the instant invention are capable of many varied applications, all of which are intended to be comprehended herein.

As is well known to those versed in the art, the provision of a hidden or concealed hinge, connecting the temples to the spectacle front, is highly desirable from an esthetic-design point of view. It has, in the past, been attempted to provide hinges accomplishing this purpose, but such hinges have not been entirely satisfactory, usually being quite expensive and complicated to produce, of excessive bulk so as to mar the esthetic appearance of the spectacles, and sometimes causing distortion of the spectacle frames.

It is an important object of the present invention to provide a hidden, concealed or blind hinge construction which overcomes the above-mentioned difficulties, is extremely simple and inexpensive in manufacture and assembly, durable and reliable throughout a long useful life, and which is entirely concealed from the front side of the spectacles, while requiring but little space and effecting no distortion of the spectacle frame.

As is also well known to those versed in the art, difficulty has heretofore been encountered in replacing broken culty has heretofore been encountered in replacing broken or deformed spectacle hinges. It was frequently necessary to discard an entire frame when hinge ears or barrels became broken off and required replacement. Hence, it is also an important object of this invention to provide means for ready replacement of hinges, it being merely necessary to remove the hinge plate fastener screw, and replace a new hinge plate using the same fastener screw.

Other objects of the present invention will become apparent upon reading the following specification and referring to the accompanying drawings, which form a material part of this disclosure.

The invention accordingly consists in the features of construction, combinations of elements, and arrangements of parts, which will be exemplified in the construction hereinafter described, and of which the scope will be indicated by the appended claim.

In the drawings:

FIGURE 1 is a partial rear perspective view showing a spectacle and hinge construction in accordance with the teachings of the present invention.

FIGURE 2 is a sectional view taken generally along the line 2—2 of FIGURE 1, with the temple and its hinge part removed.

FIGURE 3 is a sectional view similar to FIGURE 2, but illustrating the manner of hinge assembly in accordance with the teachings of the present invention.

FIGURE 4 is a longitudinal view showing an anchor or nut of the present invention in an expanded condition.

FIGURE 5 is a longitudinal view showing a nut or anchor of the present invention in its initial condition, prior to use.

FIGURE 6 is an end view, taken from the lower end, of the anchor of FIGURE 4.

FIGURE 7 is an end view, taken from the lower end of the anchor of FIGURE 5.

Referring now more particularly to the drawings, and specifically to FIGURE 1 thereof, a pair of spectacles is there generally designated 10, and includes a front piece or frame 11, and a side piece or temple 12. The temple 12 is hingedly connected to the front piece 11, as by a hinge construction, generally designated 13. The hinge construction 13 may include a pair of hinge plates 14 and 15, having the usual interfitting knuckles, and pivotally connected together, as by a pin or screw 16.

Referring now to FIGURE 4, there is shown an anchor, bushing or nut, generally designated 18, which is employed in the hinge construction 13, in a manner appearing more fully hereinafter. The anchor or bushing 18 includes a generally circular or annular member or ring 19 having a central through bore provided with internal threads 20. The external surface or periphery of the annular member 19 is non-circular, as by serrations or knurling 21. Projecting from one side of the annular member 19, the underside thereof as seen in FIGURE 4, are a plurality of spaced legs 22. Thus, the legs 22 extend generally longitudinally of the annular member 19, from one side thereof, at circumferentially spaced locations thereabout. In the condition of FIGURE 4, the inner or facing sides of the several legs 22 are formed with internal screw threads 23, in continuation of the internal screw threads 20. Further, the outer or non-facing surfaces of the legs 22, as at 24, are configured to flare or diverge from each other in the direction away from the annular member 19 to a laterally outstanding shoulder or projection 25 facing generally toward the annular member. From the shoulder or projection 25 of each leg 22, the leg may have its end surface 26 generally rounded.

Thus, it will now be appreciated that the legs 22 are of generally increasing cross-sectional area in the direction away from annular member 19, so that the leg regions 27 adjacent to the annular member are of minimum cross section. The condition of anchor or bushing 18 shown in FIGURE 4 may be that of manufacture, as by screw-machine procedures, the external surfaces being turned, the serrations 21 rolled, the threads 20 and 23 being cut or tapped, and the interleg spaces 28 being milled. Of course, the manufacturing procedure may be otherwise, as desired.

Prior to assembly of the anchor or bushing 18, the legs 22 are squeezed together to assume the condition shown in FIGURE 5. It will there be apparent that the external leg projections or shoulders 25 do not extend radially or laterally beyond the periphery of the annular member 19, and also that the facing internally threaded surfaces 23 of the legs converge in the general direction away from the annular member.

Referring now to FIGURE 3, the spectacle frame or front piece 11 is provided on its inner surface 30 with a recess 31 configured to conformably receive the hinge plate 14. The hinge plate 14 may have its exposed surface substantially flush with the inner surface 30 of the front piece 11. The hinge plate 14 may be formed with a through opening or hole 32, for a purpose appearing presently, and also provided with knuckles or gudgeons 33 for receiving the pintle 16.

The spectacle front piece 11 is formed with a blind hole or cavity 35 opening downward or inward through the bottom of recess 31 in a generally cylindrical formation and having its lower end or bottom enlarged, as by an annular undercut region 36 defining an annular inwardly facing shoulder 37. The cavity 35 is in substantial alignment with and larger than the hinge-plate hole 32 when the hinge plate 14 is conformably engaged in the recess 31.

Prior to engaging the hinge plate 14 in its recess 31, a bushing or anchor 18 in the condition of FIGURE 5 is inserted into the cavity 35, as appears in FIGURE 2. The leg projections or shoulders 25 are radially withdrawn inward for free insertion in the cavity 35 into the enlarged inner or undercut region 36. The annular member 19 with its externally serrated peripheral surface 21 is press-fitted into the upper or outer region of the cavity 35, spaced from the inner or bottom wall of the latter. In this manner, the annular member 19 defines a non-rotative press fit in the cavity 35.

The hinge plate 14 may then be engaged in the recess 31, with the hinge-plate opening 32 in substantial alignment with the internally threaded central opening of the annular member 19.

A mating threaded member or screw 40 has its shank extended inward through the hinge-plate hole 32 and thence in threaded engagement through the annular member 19. Upon continued inward threaded engagement of the screw 40, with the screw threads 23 on the inner or facing sides of legs 22, the legs are caused to spread outward, bending thereof being localized in the relatively narrow leg regions 27, to swing the enlarged portions, projections or shoulders 25 outward into the undercut cavity regions 36. If desired, the undercut cavity region 36 and shoulders 25 may be dimensioned for an effective biting action of the shoulders in the cavity.

The outer end of fastener 40 is provided with a head 41, which may have a screwdriver slot 42. The underside of the head 41 may be slightly concave, as at 43 leaving a downwardly facing relatively sharp circumferential edge 44.

Upon continued threaded insertion of screw 40, the head 41 engages the outer surface of hinge plate 14 and effects upward or outward withdrawal of the anchor 18 until the shoulders 25 are in firm abutting engagement with the cavity shoulder 37. Thus, the anchor 18 may, upon tightening of screw 40, be moved outward slightly away from the bottom of cavity 35, and the annular member 19 moved toward the hinge plate 14, as best illustrated in FIGURES 3 and 4. Further, the concave underside 43 of screw head 41 enables the latter to deflect slightly upon forcible engagement with the hinge plate 14 to cause slight piercing of the edge 44 into the hinge plate and effect a locking action of the screw against accidental loosening or removal. Also, the outwardly flaring surfaces 24 of legs or prongs 22 are engageable with the internal surfaces of cavity 35 to further resist outward withdrawing of the anchor or bushing 18.

From the foregoing, it will now be appreciated that the construction of the instant invention provides a device which fully accomplishes its intended objects, and is otherwise well suited for practical conditions of manufacture, assembly and use. In addition, as there is no pressure against the front side of the frame 11, there is no bulging or buckling to mar the appearance of the frame. Obviously, there is no use or reliance upon cement, lamination, or solvents, to obviate their inherent difficulties. It will also be appreciated that the instant device occupies an extremely small space so as not to interfere with esthetic design, and makes possible easy and economical replacement of hinges, in the event of hinge failure or breakage.

Although the present invention has been described in some detail by way of illustration and example for purposes of clarity of understanding, it is understood that certain changes and modifications may be made within the spirit of the invention and scope of the appended claim.

What is claimed is:

1. In a spectacle construction, the combination comprising a frame piece having a recess on its inner side, said frame piece being formed with blind cavities extending inward from the bottom of said recess, said cavities being undercut to provide retaining abutments, an annular member externally serrated for non-rotatable gripping engagement with the cavity wall, said annular member being spaced from the bottom of said cavity, a plurality of legs extending from circumferentially spaced locations about said annular member toward the bottom of said cavity, each of said legs having external projections thereon comprising shoulders facing toward said annular member for abutting engagment with said undercut, and said legs having their facing surfaces converging toward their free ends, said annular member and said legs being internally threaded, a hinge plate conformably seated in said recess, and a threaded fastener extending through said hinge plate into threaded engagement with said annular member and said legs to spread the latter for firm embedded engagement beneath said abutment for positive retention of said hinge plate, and whereby the legs of said annular member will be permanently spread for interlocking engagement in said recess upon the initial insertion of said threaded member thus to permit withdrawal and re-insertion of said threaded member, and said fastener having a head for abutment with the adjacent hinge plate, said head having a concave underside and being deflectable for biting engagement with the adjacent hinge plate.

References Cited

UNITED STATES PATENTS

| | | | |
|---|---|---|---|
| 519,172 | 5/1894 | Calkins | 85—84 |
| 2,058,197 | 10/1936 | West. | |
| 2,379,786 | 7/1945 | Bugg et al. | 85—84 |
| 2,448,351 | 8/1948 | Brush | 85—84 |
| 2,561,433 | 7/1951 | Uhle | 85—84 |
| 2,785,726 | 3/1957 | Brush | 85—84 |
| 2,959,204 | 11/1960 | Rigot | 151—37 |

FOREIGN PATENTS

| | | |
|---|---|---|
| 753,819 | 8/1956 | Great Britain. |

DAVID SCHONBERG, *Primary Examiner.*

J. W. LEONARD, *Assistant Examiner.*